United States Patent
Eom

(10) Patent No.: US 7,446,721 B2
(45) Date of Patent: Nov. 4, 2008

(54) SATELLITE TRACKING ANTENNA SYSTEM AND METHOD THEREFOR

(75) Inventor: Kwang Sik Eom, Anyang-si (KR)

(73) Assignee: Intellian Technologies Inc., Seoul (KR)

( * ) Notice: Subject to any disclaimer, the term of this patent is extended or adjusted under 35 U.S.C. 154(b) by 98 days.

(21) Appl. No.: 10/592,414

(22) PCT Filed: Mar. 11, 2005

(86) PCT No.: PCT/KR2005/000731

§ 371 (c)(1),
(2), (4) Date: Jan. 25, 2007

(87) PCT Pub. No.: WO2005/088766

PCT Pub. Date: Sep. 22, 2005

(65) Prior Publication Data

US 2007/0159405 A1 Jul. 12, 2007

(30) Foreign Application Priority Data

Mar. 11, 2004 (KR) .................. 10-2004-0016661
Apr. 21, 2004 (KR) .................. 10-2004-0027614

(51) Int. Cl.
*H01Q 3/00* (2006.01)
(52) U.S. Cl. .................. 343/757; 343/766; 343/781 CA
(58) Field of Classification Search .................. 343/757, 343/761, 766, 781 R, 781 P, 781 CA
See application file for complete search history.

(56) References Cited

U.S. PATENT DOCUMENTS 2,681,991 A * 6/1954 Marco et al. ................. 343/757
4,041,500 A 8/1977 Lapp
5,398,035 A 3/1995 Densmore et al.

(Continued)

FOREIGN PATENT DOCUMENTS

JP 6-104780 4/1994

(Continued)

OTHER PUBLICATIONS

G.J. Hawkins, et al; "Operational analysis of electronic tracking schemes", IEE Proceedings I. Solid-State & Electron Devices, Institution of Electrical Engineers, Stevenage, GB, vol. 136, No. 3, Jun. 1, 1989, pp. 181-188, XP000096658.

(Continued)

*Primary Examiner*—HoangAnh T Le
(74) *Attorney, Agent, or Firm*—Ladas & Parry LLP

(57) ABSTRACT

The present invention relates to a satellite tracking antenna system and a satellite tracking method. Step tracking in which the size of a satellite signal sampled in at least one position in which a reflector of the satellite tracking antenna system is tilted is compared to track a satellite is performed, and a measured value of the satellite signal sampled in a specific position in which the reflector is tilted in N−1th tracking and a measured value of the satellite signal sampled in the specific position in which the reflector is tilted in Nth tracking are averaged to compute a value. The reflector is driven according to the value to track the satellite, thereby minimizing a satellite tracking error caused by a sudden movement of a mobile body equipped with the satellite tracking antenna system.

16 Claims, 11 Drawing Sheets

U.S. PATENT DOCUMENTS

| | | | |
|---|---|---|---|
| 6,087,985 | A | 7/2000 | Rümmeli et al. |
| 6,191,734 | B1 | 2/2001 | Park et al. |
| 2003/0214449 | A1 | 11/2003 | King |
| 2006/0097940 | A1* | 5/2006 | Shimawaki et al. .......... 343/761 |
| 2007/0097004 | A1* | 5/2007 | Sohfuku ...................... 343/757 |

FOREIGN PATENT DOCUMENTS

| | | |
|---|---|---|
| JP | 95-701492 | 2/1996 |
| KR | 96 701492 | 2/1996 |

OTHER PUBLICATIONS

European Search Report dated Feb. 14, 2008; Application No./Patent No. 05726757.7-2220; PCT/KR2005000731.

* cited by examiner

PREDETERMINED POSITION MEASUREMENT TIME

POSITION MEASUREMENT TIME DISTORTED BY MOTOR SPEED CHANGE

SATELLITE TRACKING ANTENNA SYSTEM AND METHOD THEREFOR

TECHNICAL FIELD

The present invention relates to a satellite tracking antenna system and a method of tracking satellites, and more particularly, to an antenna system and a method of tracking satellites, which can minimize satellite tracking error according to movements of a mobile body equipped with the satellite tracking antenna system. In operation of step tracking in which the size of satellite signal sampled in at least one specific position in which a reflector of the satellite tracking antenna system is tilted is compared to track the satellite, a measured value of a satellite signal sampled in a specific position in which the reflector is tilted in N–1th tracking and a measured value of a satellite signal sampled in the specific position in which the reflector is tilted in Nth tracking are averaged to drive the reflector according to the computed value.

Also, the present invention relates to a satellite tracking antenna system which can precisely track a satellite. In operation of conical scan in which a satellite is tracked by rotating and tilting a sub-reflector, a sampling period in which a satellite signal is sampled in at least one specific position in which the sub-reflector is tilted in N+1th rotation of the sub-reflector is computed by using Nth rotation period of the sub-reflector, the sampling period is compensated in real time in response to rotation speed change of the sub-reflector, thereby more precisely tracking the satellite.

BACKGROUND ART

In an information society, a plurality of contents provider provides very large amount of information at the moment. According to development of communication technology and gradually extended diffusion of systems quickly processing a large amount of information, information transmission between systems by using a satellite is already applied in many fields. Particularly, the requirement of developing a more effective satellite antenna mounted on a mobile body is increased for smooth communication between a satellite and a satellite antenna mounted on mobile body such as vessels or vehicles.

A satellite antenna mounted on a mobile body is an apparatus for favorably receiving a satellite signal by precisely directing an antenna to a satellite when the mobile body is quickly moved or turned. Accordingly, a more delicate control technique to always track a satellite is required differently from a fixed satellite antenna.

A step tracking method is generally used as a satellite tracking method of a satellite antenna, in which a reflector is tilted in at least one specific direction, a satellite signal size in each position in which the reflector is tilted is measured, and the satellite signal sizes are compared with each other, thereby compensating the directional direction of the reflector. Since the step tracking method has a long sampling period in which a satellite signal is sampled in a direction in which the reflector is tilted in order to compensate the directional direction of the reflector, it is not easy that the directional direction of the reflector is quickly compensated in response to rapid movements of a mobile body.

In order to solve the problem caused by the size of the sampling period, when a mobile body is suddenly moved, the directional direction of the reflector in response to the movements of the mobile body is compensated by using a position sensor such as a gyro sensor having quick response speed. The directional direction of the reflector is fine tuned by tilting the reflector.

FIG. 1 is a diagram illustrating an error signal between a main lobe of a satellite signal and a directional direction of a satellite tracking antenna when a mobile body equipped with a satellite tracking antenna system according to a conventional art.

Referring to FIG. 1, when a mobile body equipped with a satellite tracking antenna is not moved, the satellite tracking antenna computes error information between a directional direction of a reflector and a position of a main lobe of a satellite signal by using a satellite signal level value $$v(t_n^2)$$

and a satellite signal level value $$v(t_n^4),$$

thereby generating an accurate error signal. The satellite signal level value $$v(t_n^2)$$

is a value of a state in which the reflector is tilted left, and the satellite signal level value $$v(t_n^4)$$

is a value of a state in which the reflector is tilted right. In this case, an equation $$e_{azimuth} = v(t_n^2) - v(t_n^4)$$

is for an azimuth error signal, and an equation $$e_{elevation} = v(t_n^1) - v(t_n^3)$$

is for an elevation error signal.

FIG. 2 is a diagram illustrating an error signal between a main lobe of a satellite signal and a directional direction of a satellite tracking antenna when a mobile body equipped with a satellite tracking antenna is moved left.

Referring to FIG. 2, a directional direction of a satellite tracking antenna is the same as shown in FIG. 1. When a mobile body equipped with a satellite tracking antenna is moved left caused by rotation or a sudden shaking, the satellite tracking antenna obtains a satellite signal level value sampled in case that a reflector is tilted left and a satellite signal level value $$v(t_n^4)$$

sampled in case that the reflector is tilted right. In this case, an error occurs in a satellite signal level value with respect to a main lobe of a satellite signal caused by movement of the mobile body. Therefore, an error occurs in generating an error signal. Namely, since the satellite signal level value $$v(t_n^2)$$

sampled in case that the reflector is tilted left is obtained and the satellite signal level value $$v(t_n^4)$$

sampled at the position indicated by a dotted line of FIG. 2 in case that the reflector is tilted right caused by movement of the mobile body, an error signal larger than the original error signal. The described above may appear as the opposite phenomenon according to the order of obtaining satellite signal level values and generating error signals according to the direction of tilting the reflector.

FIG. 3 is a diagram illustrating an error signal between a main lobe of a satellite signal and a directional direction of a satellite tracking antenna when a mobile body equipped with a satellite tracking antenna is rotated right.

A distorted error signal of a value smaller than the original error signal is generated similar to the description of FIG. 2 when the mobile body of FIG. 3 is rotated right.

As illustrated in FIGS. 1 through 3, according to the satellite tracking antenna using the conventional step tracking, when a sudden movement of the mobile body equipped with the satellite tracking antenna occurs, an error is generated in generating an error signal with respect to a directional direction of a reflector, thereby not precisely tracking a satellite.

Also, there is a conical scan method as a satellite tracking method of a satellite tracking antenna, in which a sub-reflector of the satellite tracking antenna is tilted in at least one specific position, the size of a satellite signal sampled at each position in which the sub-reflector is tilted is measured, and the sizes of the satellite signals are compared with each other, thereby tracking a satellite.

Satellite tracking antenna tracking a satellite according to the conical scan method is widely used because the satellite tracking antenna tracks a satellite by using only satellite signals received from a satellite, thereby simply forming a system and not requiring compensation of a gyro sensor caused by an environmental factor.

However, a satellite tracking antenna employing a conventional conical scan method has a technical problem to set a sampling period which is information of the amount of time for precisely sampling a satellite signal at each position in which a sub-reflector is tilted. Also, when the sub-reflector is rotated and a satellite signal sampling period is determined according to the rotation period of the sub-reflector, the rotation period of the sub-reflector is continuously changed caused by aging and wear of a sub-reflector rotation part rotating the sub-reflector. When the rotation period of the sub-reflector is changed as described above, the satellite signal sampling period may be also changed. It is difficult to precisely track a satellite without frequently compensating the satellite signal sampling period.

As described above, according to a conventional satellite tracking antenna, since a satellite is tracked without compensating an error of a satellite tracking signal which may occur caused by the movement of a mobile body, a distorted result may be generated. Also, since a satellite is tracked by sampling a satellite signal without properly compensating a satellite signal sampling period according to rotation period change of a sub-reflector, tracking satellite is not precisely performed.

In order to solve the described problems, a satellite tracking antenna that can precisely and effectively track a satellite by compensating a directional direction of a reflector in response to the movement of a mobile body is required.

DISCLOSURE OF INVENTION

Technical Goals

To improve the conventional technology, the present invention provides a satellite tracking antenna system and a satellite tracking method that can precisely track a satellite regardless of a sudden movement of a mobile body equipped with the satellite tracking antenna system. A reflector of a satellite tracking antenna system is tilted in at least one specific direction. A satellite signal level value sampled at a position in which the reflector is tilted in a specific direction in N–1 tracking and a satellite signal level value sampled at a position in which the reflector is tilted in the specific direction are averaged. Azimuth or elevation error signal is generated by averaging the sampled satellite signal level values. A directional direction of the reflector is moved according to the error signal such that the reflector is always directed to a main lobe of a satellite, thereby precisely tracking the satellite.

The present invention also provides a satellite tracking antenna system and a satellite tracking method that can more precisely and effectively track a satellite by tilting a sub-reflector regardless of a sudden movement of a mobile body. A satellite signal level value sampled at a position in which the sub-reflector is tilted in a specific direction in N–1th tracking and a satellite signal level value sampled at the position in which the sub-reflector is tilted in the specific direction in Nth tracking are averaged to generate an azimuth or elevation error signal. A directional direction of a reflector is moved according to the error signal to realize conical scan allowing the reflector is directed to a main lobe of a satellite, thereby precisely and effectively tracking the satellite by tilting the sub-reflector.

The present invention also provides a satellite tracking antenna system and a satellite tracking method in which an absolute position measurement bar is installed at a sub-reflector and a detection means is installed at a sub-reflector rotation part. When the absolute position measurement bar passes the detection means, an interrupt signal is generated to measure the rotation period of the sub-reflector in real time. A sampling period that is the amount of time for sampling a satellite signal is frequently updated and compensated by using the rotation period of the sub-reflector. Although the rotation period of the sub-reflector is changed, the satellite signal is sampled at a regular position in which the sub-reflector is tilted, thereby more precisely tracking a satellite.

Technical Solutions

To achieve the goals and solve the problems of a conventional art, according to an aspect of the present invention, there is provided a satellite tracking antenna system including: a reflector directed to a predetermined satellite, tilted in a direction of a predetermined azimuth or elevation toward the satellite, and receiving a satellite signal from the satellite; an azimuth signal level measuring part computing a first azimuth measurement value which is a difference between azimuth satellite signal level values sampled respectively in a first azimuth position and second azimuth position of Nth tracking of the reflector, computing a second azimuth measurement value which is a difference between azimuth satellite signal level values sampled respectively in the first azimuth position and second azimuth position of N−1th tracking, and averaging the computed first azimuth measurement value and the second azimuth measurement value to generate an azimuth error signal; an azimuth position/speed control part generating an azimuth control command signal with respect to the satellite directional direction using the azimuth error signal; and a reflector driving means for driving the reflector in azimuth direction according to the azimuth control command signal.

According to an aspect of the present invention, there is provided a satellite tracking antenna system including: a reflector directed to a predetermined satellite and receiving a satellite signal from the satellite; a sub-reflector tilted in a predetermined azimuth or elevation and receiving the satellite signal reflected by the reflector to focus on a predetermined lead-in waveguide; an azimuth signal level measuring part computing a first azimuth measurement value which is a difference between azimuth satellite signal level values sampled respectively in a first azimuth position and second azimuth position of Nth tracking of the reflector, computing a second azimuth measurement value which is a difference between azimuth satellite signal level values sampled respectively in the first azimuth position and second azimuth position of N−1th tracking, and averaging the computed first azimuth measurement value and the second azimuth measurement value to generate an azimuth error signal; an elevation signal level measuring part computing a first elevation measurement value which is a difference between elevation satellite signal level values sampled respectively in a first elevation position and second elevation position of Nth tracking of the reflector, computing a second elevation measurement value which is a difference between elevation satellite signal level values sampled respectively in the first elevation position and second elevation position of N−1th tracking, and averaging the computed first elevation measurement value and the second elevation measurement value to generate an elevation error signal; an azimuth position/speed control part generating an azimuth control command signal with respect to the satellite directional direction using the azimuth error signal; an elevation position/speed control part generating an elevation control command signal with respect to the satellite directional direction using the elevation error signal; and a reflector driving means for driving the reflector in a direction of one of an azimuth according to the azimuth control command signal and an elevation according to the elevation control command signal.

According to an aspect of the present invention, there is provided a satellite tracking antenna system including: a reflector for receiving a satellite signal from a predetermined satellite; a sub-reflector tilted in at least one specific position and focusing the satellite signal reflected by the reflector on a predetermined lead-in waveguide; a sub-reflector rotation part rotating the sub-reflector; a satellite signal sampling part sampling the satellite signal focused by the sub-reflector according to a predetermined sampling period; and a period control module measuring an Nth rotation period of the sub-reflector and computing the sampling period of the satellite of an N+1th rotation of the sub-reflector using the Nth rotation period, wherein the satellite signal sampling part samples the satellite signal in the at least one specific position where the sub-reflector is tilted by applying the sampling period computed by the period control module in the N+1 rotation of the sub-reflector.

According to an aspect of the present invention, may include all sort of antennas having a reflector, such as a cassegrain antenna, a flat antenna, and a horn-reflector antenna.

The cassegrain antenna widely used for convenience of description in the present specification receives a signal by using a reflector and a sub-reflector. A satellite signal is reflected by a reflector, and the reflected satellite signal is focused via a sub-reflector and transmitted to a predetermined satellite signal receiver through a feed horn. Such that a satellite tracking antenna system mounted on a mobile body receives a satellite signal, a reflector of the satellite tracking antenna system is always directed to a main lobe of a target satellite. For this, the sub-reflector is rotated via a sub-reflector rotation part equipped with a motor to realize conical scan.

In case that the conical scan is realized by rotation of the sub-reflector, a predetermined detection means is mounted on a sub-reflector rotation part and a predetermined absolute position measurement bar is mounted on the sub-reflector in order to sense an absolute position with respect to a direction of a beam of the sub-reflector tilted in at least one specific direction. Generally, a photo sensor or a magnetic sensor can be used as the detection means. An absolute encoder or resolver can be mounted on a motor shaft in case of a high-priced system. When the absolute position with respect to an angle of tilting the sub-reflector is measured by a detection means, a signal sensed by a sensor occurs once in one rotation of the sub-reflector and rotation angle of 360° is mapped on a rotation time of a motor. Accordingly, an instant of time that the sub-reflector is tilted up, down, left, and right can be determined by dividing the amount of time between the instants of time that a sensor signal is sensed.

BEST MODE FOR CARRYING OUT THE INVENTION

Hereinafter, embodiments of the present invention will be described in detail with reference to the attached drawings.

Figure 1:
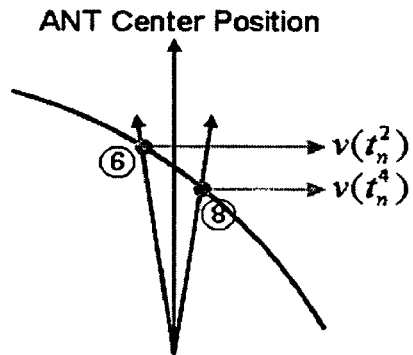
FIG. 1 is a diagram illustrating an error signal between a main lobe of a satellite signal and a directional position of a satellite tracking antenna in case that a mobile body equipped with the satellite tracking antenna is at standstill according to a conventional art.
Figure 2:
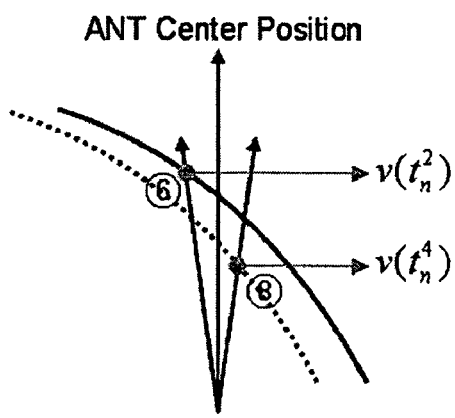
FIG. 2 is a diagram illustrating an error signal between a main lobe of a satellite signal and a directional position of a satellite tracking antenna when a mobile body equipped with the satellite tracking antenna is rotated left.
Figure 3:
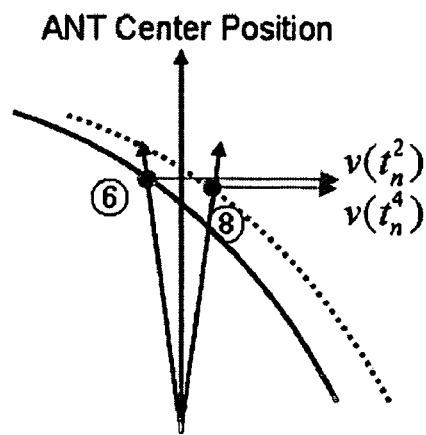
FIG. 3 is a diagram illustrating an error signal between a main lobe of a satellite signal and a directional position of a satellite tracking antenna when a mobile body equipped with the satellite tracking antenna is rotated right.
Figure 4:
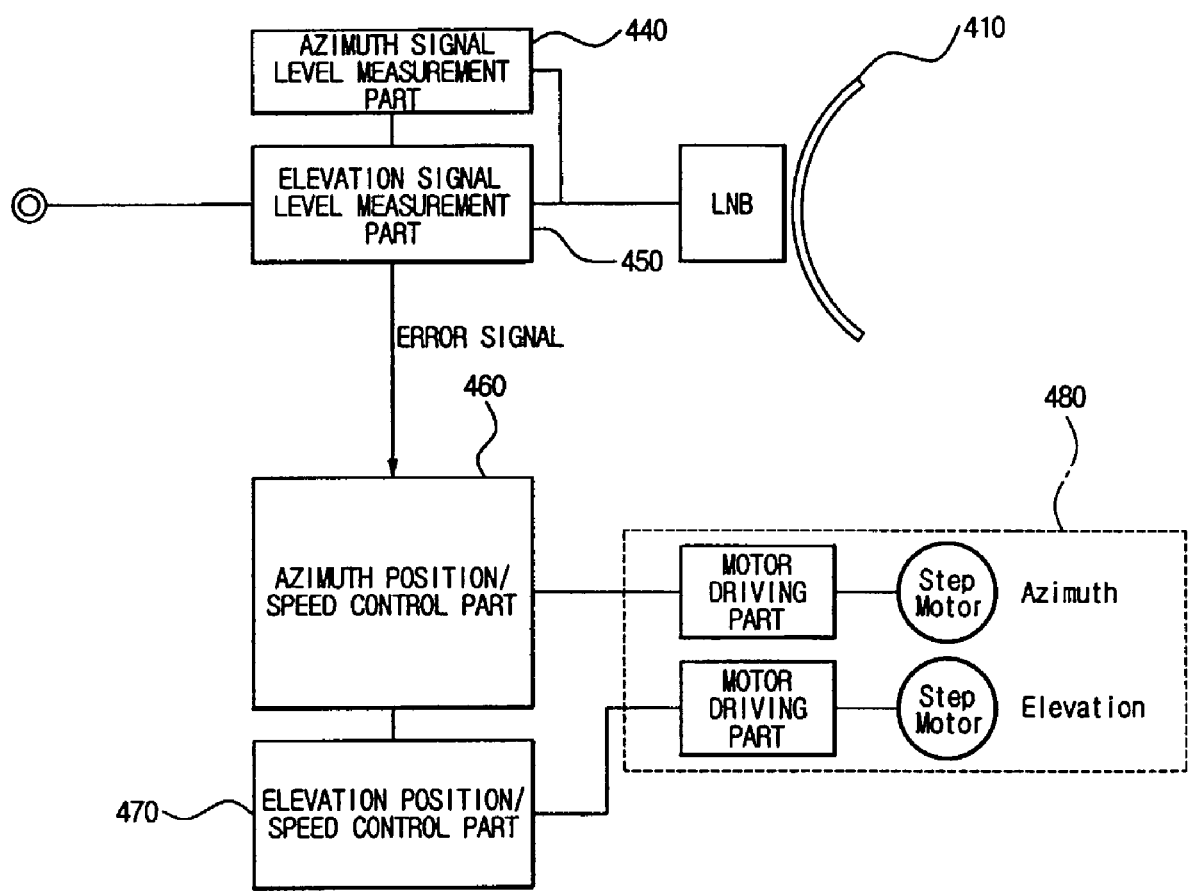
FIG. 4 is a block diagram illustrating a configuration of a satellite tracking antenna system according to a first embodiment of the present invention.

FIG. 4 is a block diagram illustrating a configuration of a satellite tracking antenna system according to a first embodiment of the present invention.

The satellite tracking antenna system according to the first embodiment tilts a reflector in at least one specific direction to perform operation of tracking satellite signal, samples a satellite signal received in at least one position in which the reflector is tilted and disposed, generates an error signal by comparing sizes between the sampled satellite signals, and compensates a directional direction of the reflector such that the reflector is directed to a main lobe of the satellite signal.

The satellite tracking antenna system shown in FIG. 4 includes a reflector 410, an azimuth signal level measuring part 440, an elevation signal level measuring part 450, an azimuth position/speed control part 460, an elevation position/speed control part 470, and a reflector driving means 480.

The reflector 410 is directed to a satellite which is tracked by the satellite tracking antenna system, performs operation of tracking to be tilted in a predetermined direction of an azimuth or elevation toward the satellite, and receives a satellite signal from the satellite. The direction of being tilted may include up, down, left, and right and any direction various changed in the direction.

When the reflector 410 performs the operation of tracking toward the satellite, the azimuth signal level measuring part 440 computes a first azimuth measurement value which is a difference of azimuth satellite signal level values respectively sampled in a first azimuth position and a second azimuth position in which the reflector 410 is tilted in Nth tracking. Also, the azimuth signal level measuring part 440 computes a second azimuth measurement value which is a difference between azimuth satellite signal level values sampled in the first azimuth position of the Nth tracking, in which the reflector 410 is tilted and in a second azimuth position of N−1 tracking, in which the reflector 410 is tilted. The azimuth signal level measuring part 440 generates an azimuth error signal by averaging the computed first azimuth measurement value and second azimuth measurement value.

The elevation signal level measuring part 450 also performs the same operations of the azimuth signal level measuring part 440 to generate an elevation error signal. The elevation signal level measuring part 450 can generate the elevation error signal by measuring an elevation satellite signal level value with respect to a position in which the reflector 410 is tilted in elevation direction.

The azimuth position/speed control part 460 generates an azimuth control command signal from the azimuth error signal generated by the azimuth signal level measuring part 440 such that the reflector 410 is directed to the main lobe of the satellite signal. The azimuth control command signal is realized including a predetermined a coordinate value which can compensate the azimuth directional direction of the reflector 410.

The elevation position/speed control part 470 generates an elevation control command signal from the elevation error signal generated by the elevation signal level measuring part 450 such that the reflector 410 is directed to the main lobe of the satellite signal. The elevation control command signal is realized including a predetermined a coordinate value which can compensate the elevation directional direction of the reflector 410.

The reflector driving means 480 drives the reflector 410 in azimuth direction or in elevation direction according to the generated azimuth control command signal or elevation control command signal. The reflector 410 driven in the azimuth direction or in the elevation direction is directed to the main lobe of the satellite signal, and the satellite tracking antenna system can effectively receive satellite signals.

Though the azimuth signal level measuring part 440, the elevation signal level measuring part 450, the azimuth position/speed control part 460, and the elevation position/speed control part 470 are all illustrated in FIG. 4, which is only for efficiency of description. The elevation signal level measuring part 450 and elevation position/speed control part 470 may be not included in case of a land mobile body such as vehicles, which does not moves frequently in elevation direction.

Figure 5:
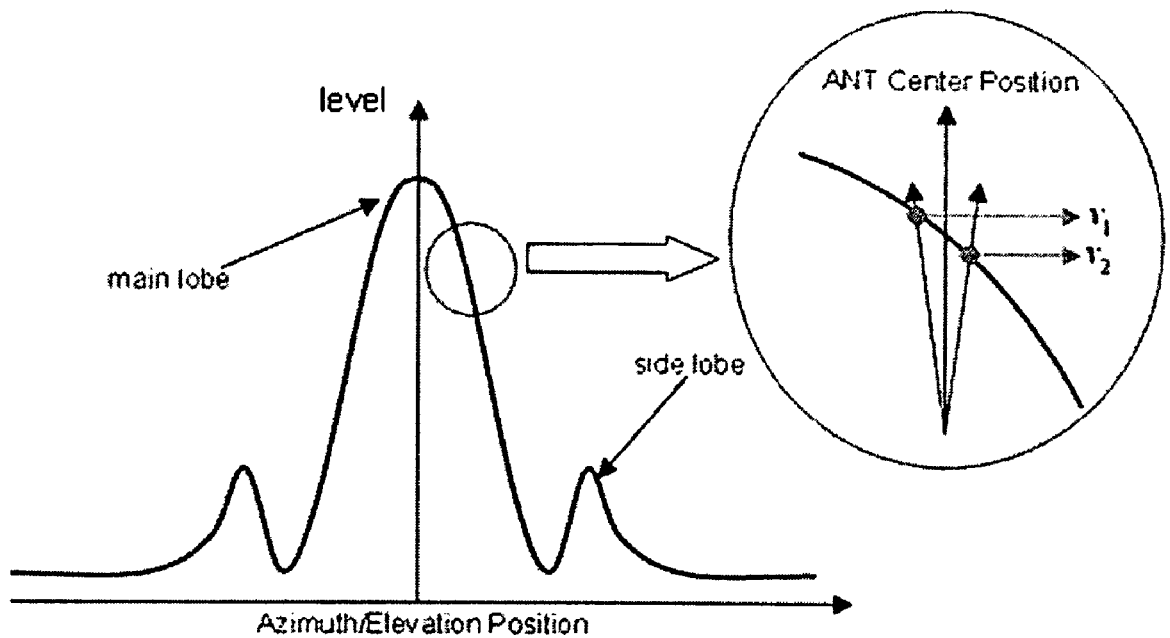
FIG. 5 is a diagram illustrating a general pattern of a satellite signal according to a reflector directional position of the satellite tracking antenna system and a deviation of satellite signal level values generated when a deviation occurs between a main lobe of a satellite signal and a directional direction of the antenna.

FIG. 5 is a diagram illustrating a general pattern of a satellite signal according to a reflector directional position of the satellite tracking antenna system and a difference of satellite signal level values generated when a deviation occurs between a main lobe of a satellite signal and a directional direction of the antenna.

Satellite signal levels left and right or up and down based on a maximum value of the satellite signal levels are classified into a main lobe and side lobe according to the directional position of the antenna. A satellite tracking antenna system tracks a satellite, which indicates that the directional direction of the reflector is controlled such that the reflector always is directed to a maximum of a main lobe of a satellite signal. Namely, it is controlled such that the maximum of the main lobe of the satellite signal received from the satellite and a maximum of a main lobe of a satellite tracking antenna signal pattern accord with each other.

When a mobile body such as vessels, vehicles, etc., which is equipped with the satellite tracking antenna system of the present invention moves, a reflector of the satellite tracking antenna system can not be directed to a maximum of a main lobe of a satellite signal because of movements of the mobile body. In this case, satellite signal level values sampled via a reflector tracking in azimuth direction, left and right, and in elevation direction, up and down or level values of satellite signals sampled by a tilted sub-reflector are compared, rotation direction and rotation speed of an azimuth motor and elevation motor of a reflector driving means are determined to control, thereby keeping always the antenna in position of maximum of the main lobe of the satellite signal.

Figure 6:
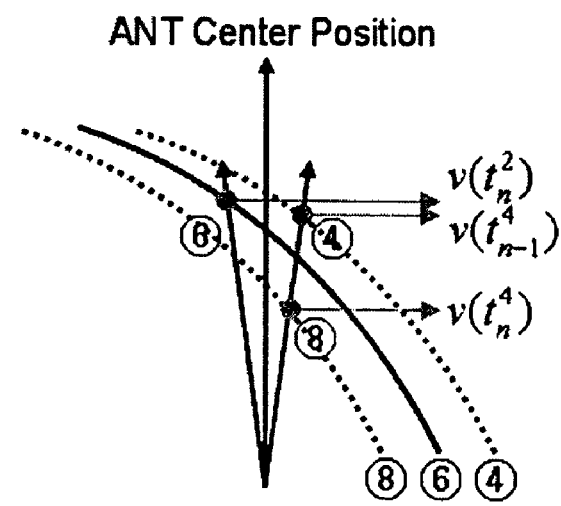
FIG. 6 is a diagram illustrating a compensation error signal between a main lobe of a satellite signal and a directional position of the satellite tracking antenna when the mobile body equipped with the satellite tracking antenna system according to the first embodiment is rotated left.

FIG. 6 is a diagram illustrating a compensation error signal between the main lobe of the satellite signal and directional position of the satellite tracking antenna when the mobile body equipped with the satellite tracking antenna system according to the first embodiment is rotated left.

Figure 7:
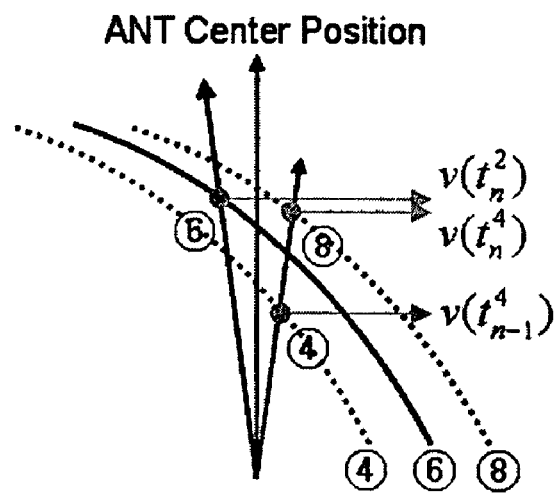
FIG. 7 is a diagram illustrating a compensation error signal between a main lobe of a satellite signal and a directional position of the satellite tracking antenna when the mobile body equipped with the satellite tracking antenna system according to the first embodiment is rotated right.

FIG. 7 is a diagram illustrating a compensation error signal between the main lobe of the satellite signal and directional position of the satellite tracking antenna when the mobile body equipped with the satellite tracking antenna system according to the first embodiment is rotated right.

Referring to FIGS. 6 and 7, in order to overcome distortion of error signal acquisition caused by the movements of the mobile body equipped with the satellite tracking antenna system, an error signal is generated using not only a satellite signal level value sampled in a process of Nth tracking of a reflector but also a satellite signal level value sampled in a process of N−1th tracking of the reflector.

The described above is a principle in which an acquisition order of satellite signal level values, determined by a direction in which a reflector tracks. For example, azimuth satellite signal level values sampled in the Nth tracking of the reflector $$v(t_n^2)$$

and $$v(t_n^4)$$

and an azimuth satellite signal level value sampled in the N−1 tracking of the reflector $$v(t_{n-1}^4)$$

are averaged, and an azimuth error is computed by using an equation of $$e_{azimuth} = \frac{1}{2}\{(v(t_n^2) - v(t_n^4)) + (v(t_n^2) - v(t_{n-1}^4))\}.$$

Also elevation satellite signal level values sampled in the Nth tracking of the reflector $$v(t_n^1), v(t_n^3),$$

and an elevation satellite signal level value sampled in the N−1 tracking of the reflector $$v(t_{n-1}^3)$$

are averaged, and an elevation error is computed by using an equation of $$e_{elevation} = \frac{1}{2}\{(v(t_n^1) - v(t_n^3)) + (v(t_n^1) - v(t_{n-1}^3))\}.$$

As described above, when the mobile body equipped with the satellite tracking antenna system moves left, since the $$v(t_n^2) - v(t_n^4)$$

is greater than an original error signal value but the $$v(t_n^2) - v(t_{n-1}^4)$$

is acquired less than the original error signal value, the two values are averaged, thereby computing an error signal close to the original error signal value.

Figure 8:
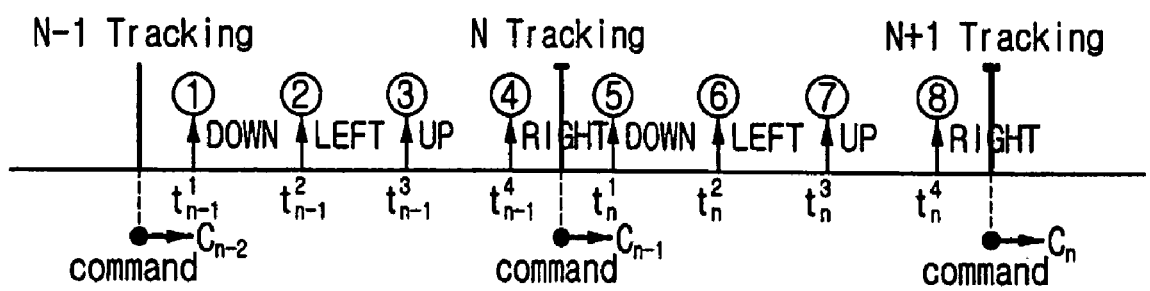
FIG. 8 is a graph illustrating a process in which the satellite tracking antenna system according to the first embodiment generates a reflector control command signal.

FIG. 8 is a graph illustrating a process in which the satellite tracking antenna system according to the first embodiment generates a reflector control command signal.

According to the first embodiment, when a reflector of the satellite tracking antenna system is tilted in a specific direction up, down, left, and right according to a predetermined tracking period to realize step tracking, satellite signal level values sampled in each position where the reflector is tilted up, down, left, and right in tracking are compared to generate an error signal, a control command signal in response to the error signal is generated, and a directional direction of the reflector can be controlled by a reflector driving means. Namely, a method of computing the error signal based on the satellite signal level values in up, down, left, and right acquired by tracking of the reflector can be used.

For example, as shown in FIG. 8, a control command signal $C_n$ with respect to Nth tracking of the reflector can be generated based on the satellite signal level values $$v(t_n^1),\ v(t_n^2),\ v(t_n^3),\ \text{and}\ v(t_n^4)$$

at instants of time $$t_n^1,\ t_n^2,\ t_n^3,\ \text{and}\ t_n^4$$

when the reflector is tilted up, down, left, and right in N−1th tracking of the reflector.

Namely, the azimuth signal level measuring part 440 of the satellite tracking antenna system of FIG. 4 computes a first azimuth measurement value $$v(t_n^2) - v(t_n^4),$$

which is a difference between an azimuth satellite signal level value $$v(t_n^2)$$

sampled in a first azimuth position of the Nth tracking of the reflector 410 and an azimuth satellite signal level value $$v(t_n^4)$$

sampled in a second azimuth position of the Nth tracking of the reflector 410. Also, the azimuth signal level measuring part 440 computes a second azimuth measurement value $$v(t_n^2) - v(t_{n-1}^4)$$

which is a difference between the azimuth satellite signal level value $$v(t_n^2)$$

sampled in the first azimuth position of the Nth tracking of the reflector 410 and an azimuth satellite signal level value $$v(t_{n-1}^4)$$

sampled in a second azimuth position of the N−1th tracking.

The azimuth signal level measuring part 440 averages the first azimuth measurement value $$v(t_n^2) - v(t_n^4)$$

and the second azimuth measurement value $$v(t_n^2) - v(t_{n-1}^4)$$

to generate the azimuth error signal $$e_{azimuth} = \frac{1}{2}\{(v(t_n^2) - v(t_n^4)) + (v(t_n^2) - v(t_{n-1}^4))\}.$$

Also, the elevation signal level measuring part 450 computes a first elevation measurement value $$v(t_n^1) - v(t_n^3),$$

which is a difference between an elevation satellite signal level value $$v(t_n^1)$$

sampled in a first elevation position of the Nth tracking of the reflector 410 and an elevation satellite signal level value $$v(t_n^3)$$

sampled in a second elevation position of the Nth tracking of the reflector 410. Also, the elevation signal level measuring part 450 computes a second elevation measurement value $$v(t_n^1) - v(t_{n-1}^3)$$

which is a difference between the elevation satellite signal level value $$v(t_n^1)$$

sampled in the first elevation position of the Nth tracking of the reflector 410 and an elevation satellite signal level value $$v(t_{n-1}^3)$$

sampled in a second elevation position of the N−1th tracking.

The elevation signal level measuring part 450 averages the first elevation measurement value $$v(t_n^1) - v(t_n^3)$$

and the second elevation measurement value $$v(t_n^1) - v(t_{n-1}^3)$$

to generate the elevation error signal $$e_{elevation} = \frac{1}{2}\{(v(t_n^1) - v(t_n^3)) + (v(t_n^1) - v(t_{n-1}^3))\}.$$

Referring to FIG. 4, the azimuth error signal and elevation error signal generated as described are transmitted to the azimuth position/speed control part 460 and elevation position/speed control part 470 respectively. The azimuth position/speed control part 460 generates an azimuth control command signal with respect to azimuth direction of the reflector 410 using the azimuth error signal, controls an azimuth driving motor of the reflector driving means 480, and adjusts azimuth position of the reflector 410 such that the satellite tracking antenna is directed to a main lobe of a target satellite signal.

Also, the elevation position/speed control part 470 generates an elevation control command signal with respect to elevation direction of the reflector 410 using the elevation error signal, controls an elevation driving motor of the reflector driving means 480, and adjusts elevation position of the reflector 410 such that the satellite tracking antenna is directed to a main lobe of a target satellite signal.

Figure 9:
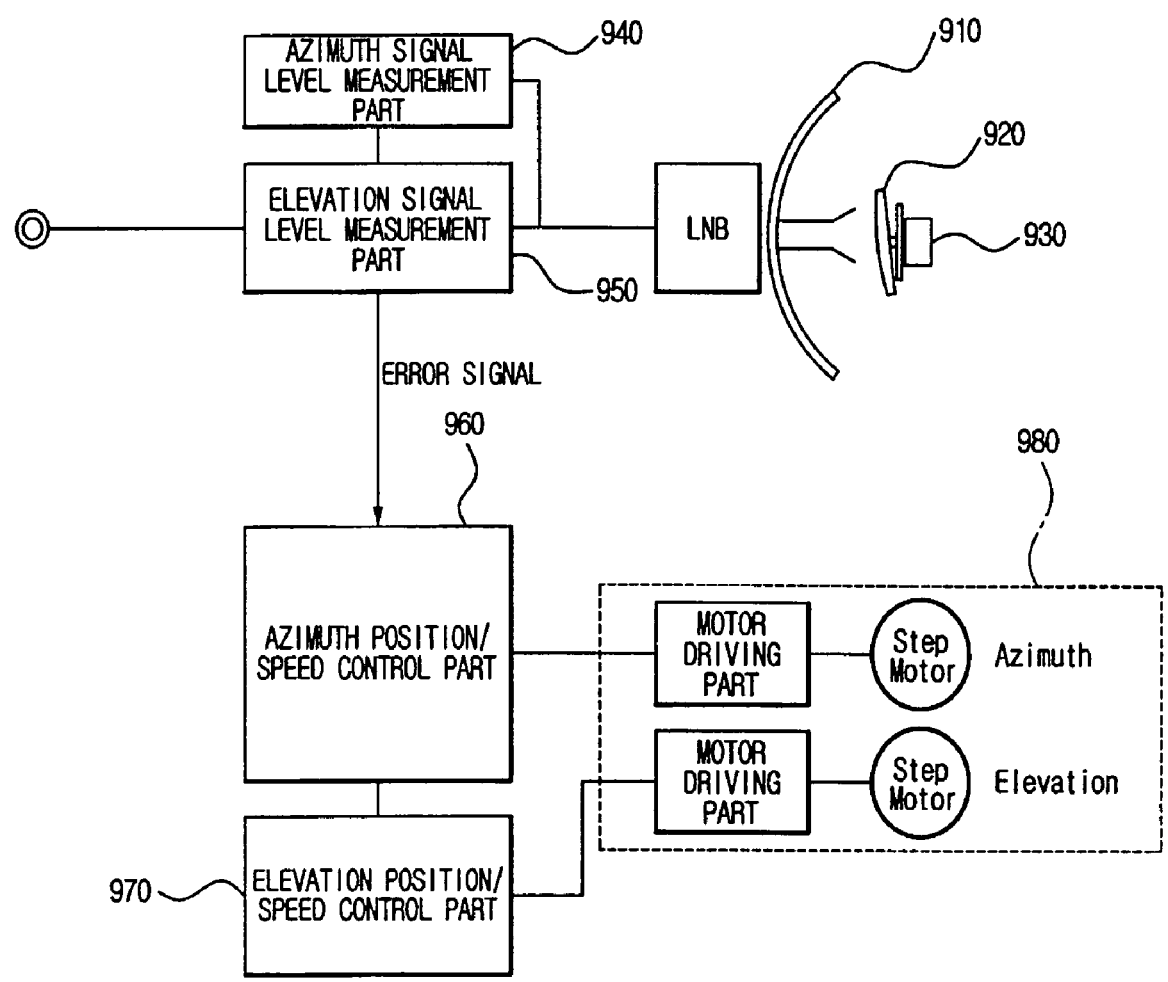
FIG. 9 is a configuration diagram illustrating a configuration of a satellite tracking antenna system according to a second embodiment of the present invention.

FIG. 9 is a configuration diagram illustrating a configuration of a satellite tracking antenna system according to a second embodiment of the present invention.

The satellite tracking antenna system according to the second embodiment of the present invention illustrated in FIG. 9 includes a reflector 910, a sub-reflector 920, a sub-reflector rotation part 930, an azimuth signal level measuring part 940, an elevation signal level measuring part 950, an azimuth position/speed control part 960, an elevation position/speed control part 970, and a reflector driving means 980.

The reflector 910 is directed to a predetermined satellite and receives a satellite signal from the satellite. The reflector 910 according to the second embodiment may not perform the operation of being tilted in at least one direction as the first embodiment described above.

The sub-reflector 920 is tilted in a predetermined azimuth or elevation direction, receives the satellite signal reflected by the reflector 910, and focuses the satellite signal on a predetermined lead-in waveguide. The sub-reflector 920 is rotated having a predetermined period by the sub-reflector rotation part 930. The method of tilting of the sub-reflector 920 will be described in detail with reference to FIGS. 10 and 11 described later.

Figure 10:
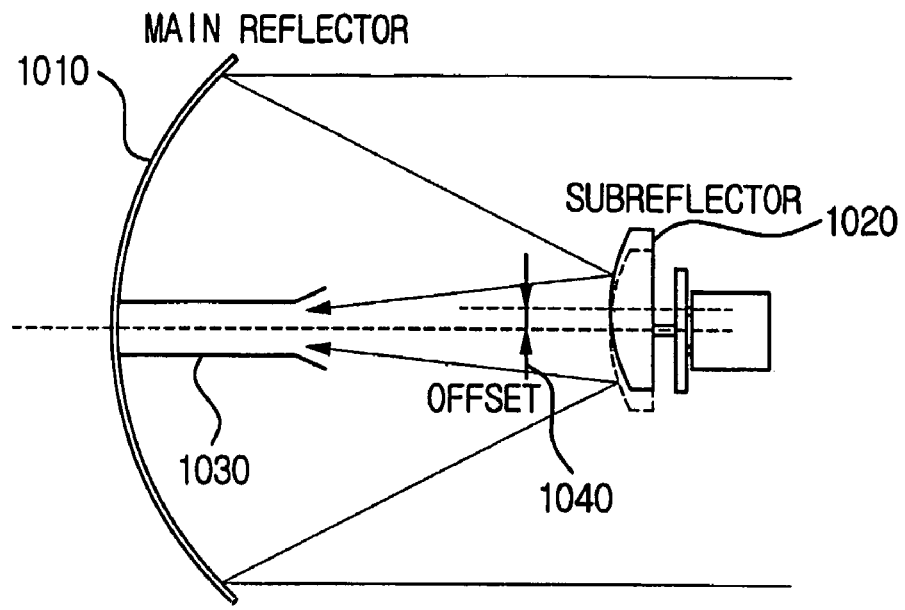
FIG. 10 is a diagram illustrating a structure in which a central axis of a sub-reflector and a central axis of a reflector are tilted to be mutually crossed in the satellite tracking antenna system according to the second embodiment.

FIG. 10 is a diagram illustrating a structure in which the central axis of a sub-reflector and the central axis of a reflector are tilted to be mutually crossed in the satellite tracking antenna system according to the second embodiment.

Figure 11:
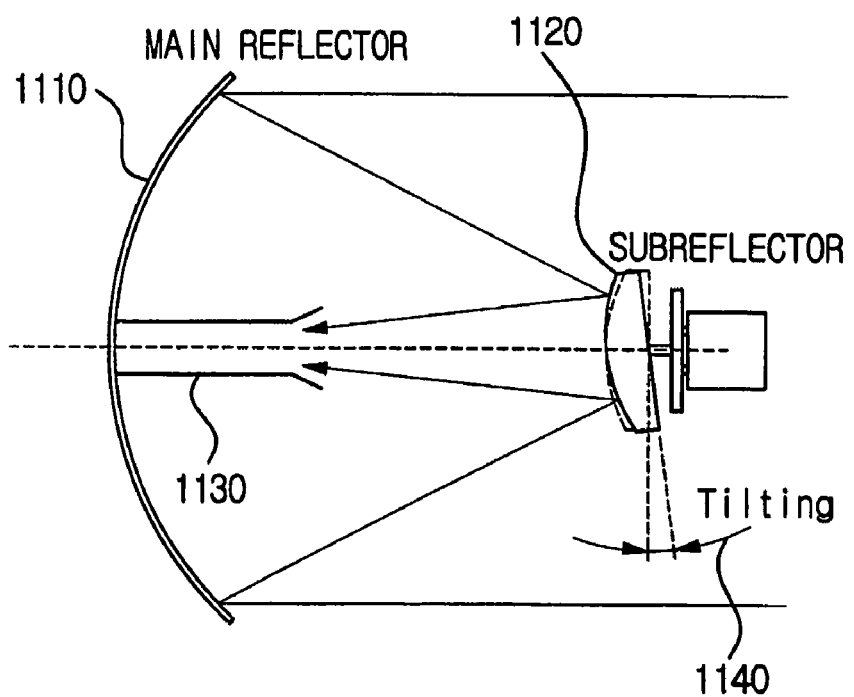
FIG. 11 is a diagram illustrating a structure in which the central axis of the sub-reflector is tilted to have a predetermined gradient with respect to the central axis of the reflector.

FIG. 11 is a diagram illustrating a structure in which the central axis of a sub-reflector is tilted to have a gradient with respect to the central axis of a reflector.

The satellite tracking antenna system according to the second embodiment can tilt a sub-reflector by applying one of the two methods illustrated in FIGS. 10 and 11. The two methods are all substantially similar in precision of generating a control command signal by sampling a satellite signal focused by a sub-reflector.

As illustrated in FIG. 10, in case that the central axis of a sub-reflector 1020 and the central axis of a reflector 1010 are tilted to be mutually crossed, if the reflector 1010 is precisely directed to a main lobe of a satellite signal, intensities of respective satellite signals when the sub-reflector 1020 is tilted right, left, up, down are measured all the same.

However, if the reflector 1010 is not precisely directed to the main lobe of the satellite signal, intensity of the satellite signal is measured more greatly in case that the sub-reflector 1020 is tilted in a direction in which the reflector 1010 is inclined with respect to the main lobe. Namely, in case that a directional direction of the reflector 1010 is biased right from a target satellite, intensity of a satellite signal received when the sub-reflector 1020 is tilted left is measured greater than intensity of a satellite signal received when the sub-reflector 1020 is tilted right. In case that a directional direction of the reflector 1010 is biased up from the target satellite, intensity of a satellite signal received when the sub-reflector 1020 is tilted down is measured greater than intensity of a satellite signal received when the sub-reflector 1020 is tilted up.

By the reason described above, if the intensities of the satellite signals received when the sub-reflector 1020 is tilted respectively up, down, left, and right are mutually compared, it can be known which direction the directional direction of the reflector 1010 is directed to. An error signal and a control command signal are generated based on a difference between the received satellite signal level values, the reflector is driven in azimuth or elevation direction in response to the command control signal, thereby precisely being directed to a main lobe of the target satellite signal to effectively receive satellite signals. The described above corresponds to the case in which the sub-reflector 1120 is tilted to have a predetermined gradient with respect to the central axis of the reflector 1110 as illustrated in FIG. 11.

Referring to FIG. 9, the azimuth signal level measuring part 940 computes a first azimuth measurement value, which is a difference between an azimuth satellite signal level value sampled in a first azimuth position of Nth tracking of the sub-reflector and an azimuth satellite signal level value sampled in a second azimuth position of the Nth tracking, computes a difference between the azimuth satellite signal level value sampled in the first azimuth position of Nth tracking of the sub-reflector and an azimuth satellite signal level value sampled in a second azimuth position of the N−1th tracking, and averages the first azimuth measurement value and the second azimuth measurement value to generate the azimuth error signal.

The elevation signal level measuring part 950 computes a first elevation measurement value, which is a difference between an elevation satellite signal level value sampled in a first elevation position of Nth tracking of the sub-reflector and an elevation satellite signal level value sampled in a second elevation position of the Nth tracking, computes a difference between the elevation satellite signal level value sampled in the first elevation position of Nth tracking of the sub-reflector and an elevation satellite signal level value sampled in a second elevation position of the N−1th tracking, and averages the first elevation measurement value and the second elevation measurement value to generate the elevation error signal.

The azimuth position/speed control part 960 generates an azimuth control command signal with respect to satellite directional direction of the reflector from the generated azimuth error signal. The elevation position/speed control part 970 generates an elevation control command signal with respect to satellite directional direction of the reflector from the generated elevation error signal. The azimuth control command signal or elevation control command signal can be realized including a predetermined coordinate value.

Figure 12:
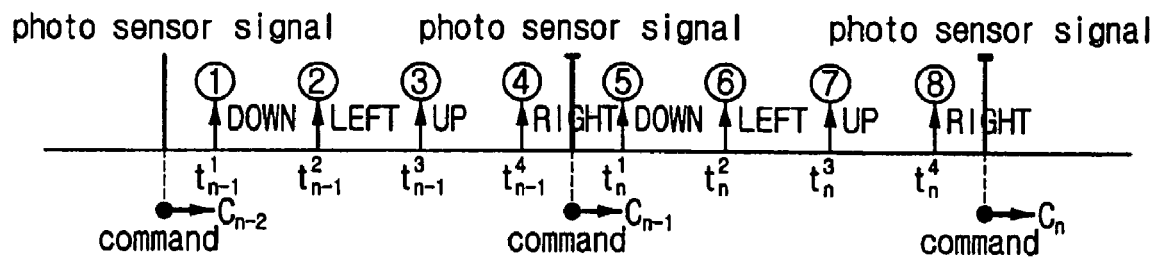
FIG. 12 is a diagram illustrating a process in which the satellite tracking antenna system according to the second embodiment generates a reflector control command signal.

FIG. 12 is a diagram illustrating a process of generating a reflector control command signal of the satellite tracking antenna system according to the second embodiment.

The sub-reflector 920 of the satellite tracking antenna system is rotated to realize conical scan as the second embodiment, the sub-reflector 920 is tilted in respective up, down, left, and right directions according to a predetermined tracking period, generates an error signal by comparing sampled satellite signal level values, generates a control command signal in response to the error signal, and drives a motor to control position of an antenna.

A control command signal $C_n$ with respect to Nth tracking of a tracking period of the sub-reflector 920 is generated based on satellite signal level values $$v(t_n^1), v(t_n^2), v(t_n^3), \text{ and } v(t_n^4)$$

sampled at instants of time $$t_n^1, t_n^2, t_n^3, \text{ and } t_n^4$$

when the sub-reflector 920 is tilted in respective up, down, left, and right directions in N–1th tracking of the tracking period.

Referring to FIG. 9, the azimuth signal level measuring part 940 computes a first azimuth measurement value $$v(t_n^2) - v(t_n^4),$$

which is a difference between an azimuth satellite signal level value $$v(t_n^2)$$

sampled in a first azimuth position of the Nth tracking of the sub-reflector 920 and an azimuth satellite signal level value $$v(t_n^4)$$

sampled in a second azimuth position of the Nth tracking of the sub-reflector 920 and computes a second azimuth measurement value $$v(t_n^2) - v(t_{n-1}^4)$$

which is a difference between the azimuth satellite signal level value $$v(t_n^2)$$

sampled in the first azimuth position of the Nth tracking of the sub-reflector 920 and an azimuth satellite signal level value $$v(t_{n-1}^4)$$

sampled in a second azimuth position of the N–1th tracking. The azimuth signal level measuring part 940 averages the first azimuth measurement value $$v(t_n^2) - v(t_n^4)$$

and the second azimuth measurement value $$v(t_n^2) - v(t_{n-1}^4)$$

to generate the azimuth error signal $$e_{azimuth} = \frac{1}{2}\{(v(t_n^2) - v(t_n^4)) + (v(t_n^2) - v(t_{n-1}^4))\}.$$

The elevation signal level measuring part 950 computes a first elevation measurement value $$v(t_n^1) - v(t_n^3)$$

which is a difference between an elevation satellite signal level value $$v(t_n^1)$$

sampled in a first elevation position of the Nth tracking of the sub-reflector 920 and an elevation satellite signal level value $$v(t_n^3)$$

sampled in a second elevation position of the Nth tracking of the sub-reflector 920 and computes a second elevation measurement value which is a difference between the elevation satellite signal level value $$v(t_n^1)$$

sampled in the first elevation position of the Nth tracking of the sub-reflector 920 and an elevation satellite signal level value $$v(t_{n-1}^3)$$

sampled in a second elevation position of the N−1th tracking. The elevation signal level measuring part 950 averages the first elevation measurement value $$v(t_n^1) - v(t_n^3)$$

and the second elevation measurement value $$v(t_n^1) - v(t_{n-1}^3)$$

to generate the elevation error signal $$e_{elevation} = \frac{1}{2}\{(v(t_n^1) - v(t_n^3)) + (v(t_n^1) - v(t_{n-1}^3))\}.$$

The reflector driving means 980 drives the reflector in azimuth or elevation direction according to the generated azimuth control command signal or elevation control command signal. Since the reflector 910 driven in the direction is precisely directed to a main lobe of a target satellite signal, the satellite tracking antenna system can receives satellite signals effectively.

Figure 13:
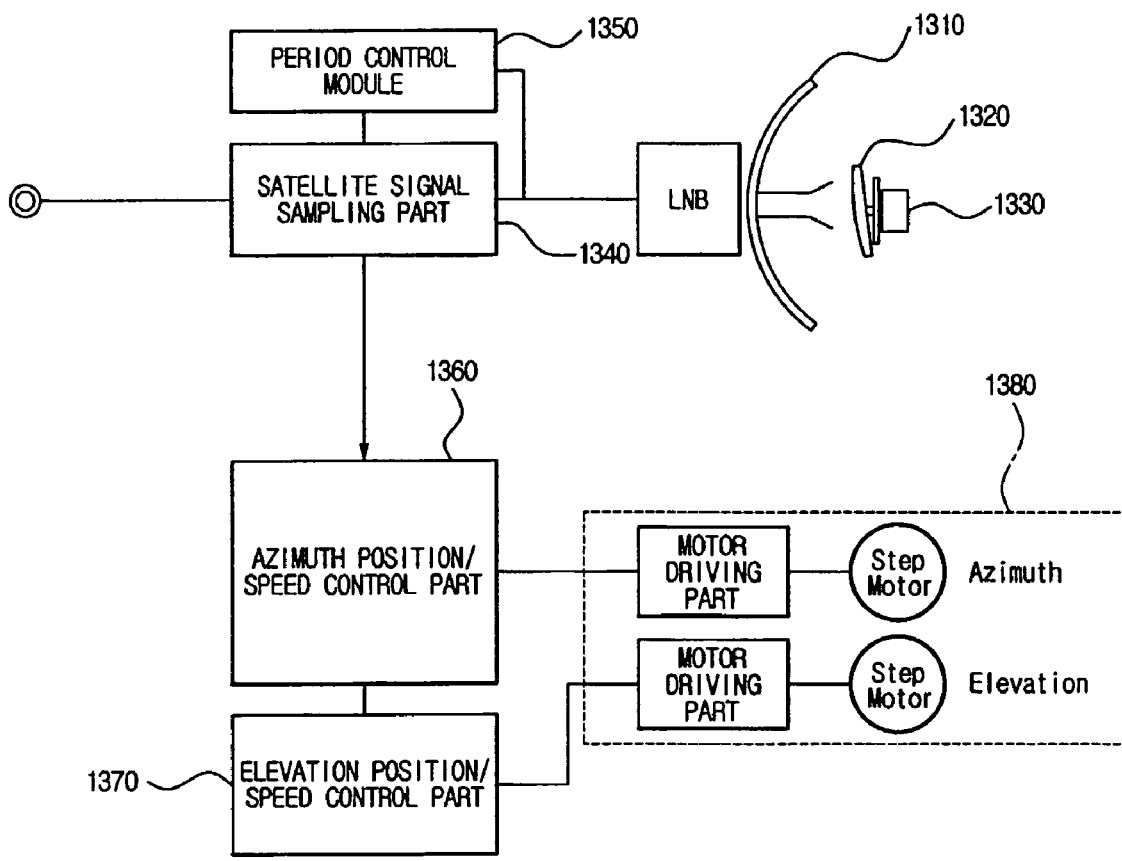
FIG. 13 is a block diagram illustrating a configuration of a satellite tracking antenna system according to a third embodiment of the present invention.

FIG. 13 is a block diagram illustrating a configuration of a satellite tracking antenna system according to a third embodiment of the present invention.

A conical scan tracking a satellite by rotating and tilting a sub-reflector can be applied to the satellite tracking antenna system according to the third embodiment, as the second embodiment. When the conical scan is realized, a rotation period of the sub-reflector may be changed according to aging, wear, etc. of a sub-reflector rotation part rotating the sub-reflector. The satellite tracking antenna system according to the third embodiment compensates a satellite signal sampling period in response to rotation period change of the sub-reflector.

As illustrated in FIG. 13, the satellite tracking antenna system includes a reflector 1310, a sub-reflector 1320, a sub-reflector rotation part 1330, a satellite signal sampling part 1340, a period control module 1350, an azimuth position/speed control part 1360, an elevation position/speed control part 1370, and a reflector driving means 1380.

The reflector 1310 receives a satellite signal from a directional satellite.

The sub-reflector 1320 is tilted in at least one specific position and focuses the satellite signal reflected by the reflector 1310 on a predetermined lead-in waveguide. The sub-reflector 1320 can be tilted by the method as described via the second embodiment and rotated by the sub-reflector rotation part 1330.

A predetermined absolute position measurement bar can be mounted on the sub-reflector 1320. The absolute position measurement bar can be rotated together with the sub-reflector 1320.

A predetermined detection means can be mounted on the sub-reflector rotation part 1330. The detection means can generate a predetermined interrupt signal at every time the absolute position measurement bar rotated by being mounted on the sub-reflector 1320 passes.

Figure 14:
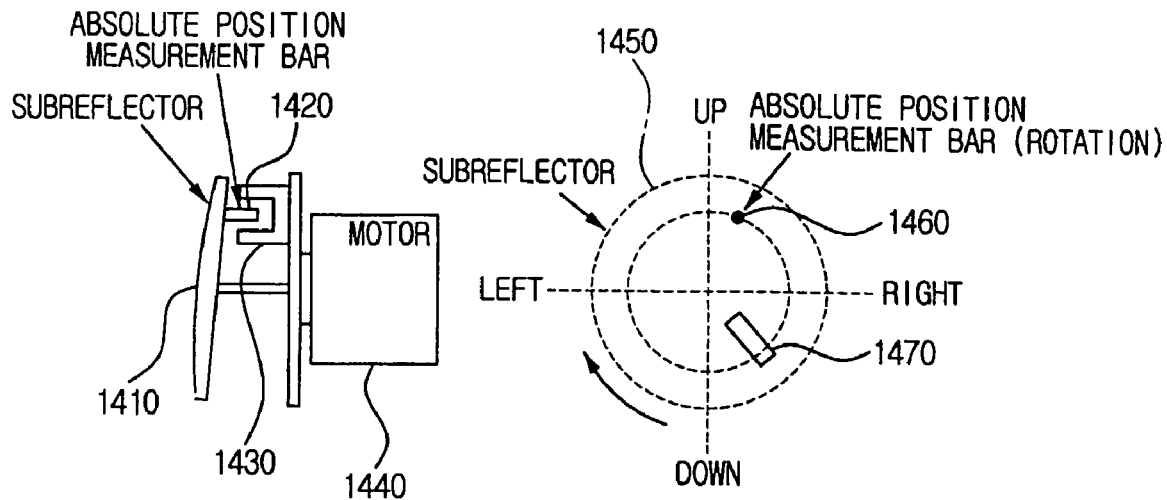
FIG. 14 is a diagram illustrating a sub-reflector and a sub-reflector rotation part of the satellite tracking antenna system according to the third embodiment.

FIG. 14 is a diagram illustrating sub-reflector and sub-reflector rotation part of the satellite tracking antenna system according to the third embodiment.

As illustrated in FIG. 14, absolute position measurement bars 1420 and 1460 are installed at sub-reflectors 1410 and 1450 in order to measure a rotation period of the sub-reflectors 1410 and 1450. Detection means 1430 and 1470 generating an interrupt signal are located in a sub-reflector rotation part 1440 in order to measure the rotation period of the sub-reflectors 1410 and 1450 at every time the absolute position measurement bars 1420 and 1460 pass.

Detection means 1430 and 1470 may be installed at the sub-reflector rotation part 1440. A magnetic sensor may be installed at the sub-reflector rotation part 1440, and an absolute encoder or a resolver may be installed on the motor shaft of the sub-reflector 1440 instead of the magnetic sensor.

On the other hand, when the detection means 1430 and 1470 are installed at the sub-reflector rotation part 1440, a signal sensed by the detection means 1430 and 1470 occurs one time at each one rotation of the sub-reflectors 1410 and 1450. 360° rotation angle may be mapped out the rotation time of the sub-reflectors 1410 and 1450. Accordingly, an instant of time when the sub-reflectors 1410 and 1450 is tilted up, down, left, and right may be determined by dividing time in which the interrupt signal is sensed.

Referring to FIG. 13, the satellite signal sampling part 1340 samples the satellite signal focused by the sub-reflector 1320 according to a predetermined sampling period.

The period control module 1350 measures an Nth rotation period of the sub-reflector 1320 and computes the satellite signal sampling period of an N+1th rotation of the sub-reflector 1320 by using the Nth rotation period. The sampling period computation will be described in detail with reference to following FIGS. 15 an 16.

Figure 15:
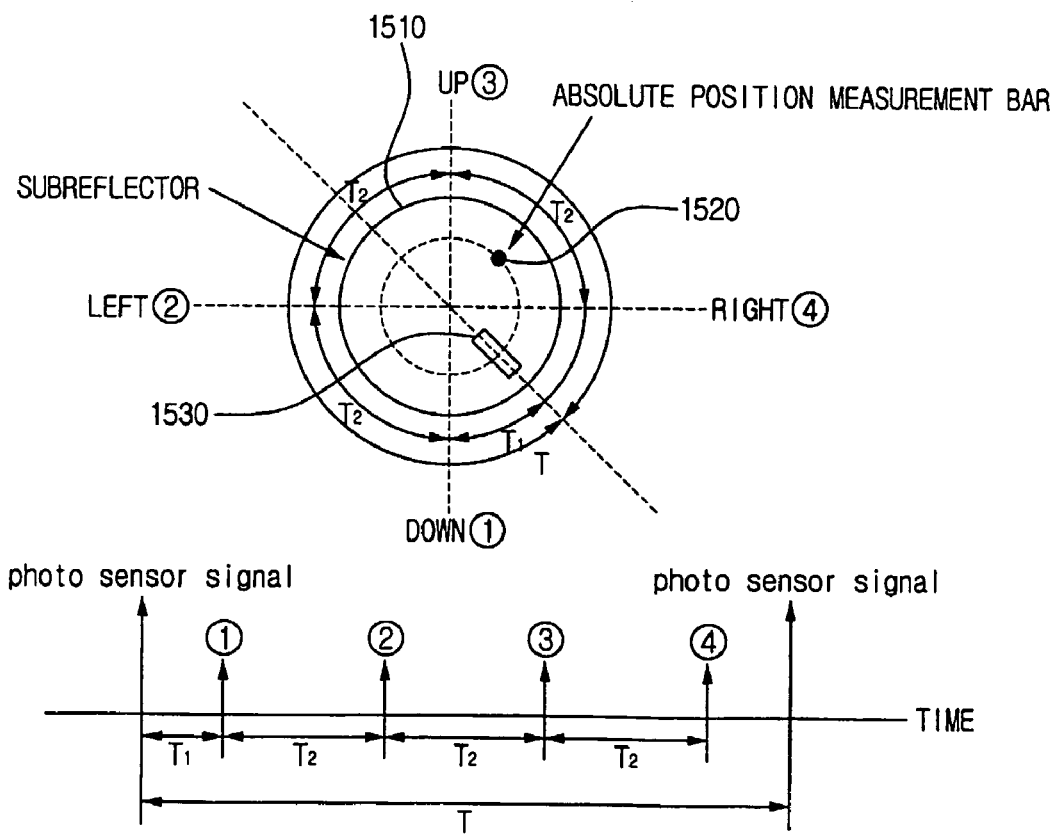
FIG. 15 is a diagram illustrating sampling period compensation according to a case in which rotation speed of the sub-reflector rotation part is regular.

FIG. 15 is a diagram illustrating sampling period generation in case that rotation speed of a sub-reflector rotation part is regular in the third embodiment.

According to the third embodiment, in case that rotation speed of a sub-reflector rotation part of a satellite tracking antenna system is regular, in a method of sampling a satellite signal at an instant of time that a sub-reflector 1510 tilted up, down, left, and right is tilted, time T in which the sub-reflector 1510 is once rotated is measured, offset time T1 which is amount of time that an interrupt signal is generated by a detection means 1530 and a first sampling is performed is measured, and time T2 which is amount of time in which second, third, and fourth samplings are performed is calculated to use a sampling period for sampling a satellite signal.

As described above, in case that the rotation speed of the sub-reflector is not changes and always regular, a satellite signal sampling method may be realized to perform a sampling with respect to the satellite signal received with a regular period when a period is once determined. On the other hand, a number of sampling the satellite signal is freely determined as two, for example, up and down, three, for example, three direction having a difference of 120°, four, etc.

Figure 16:
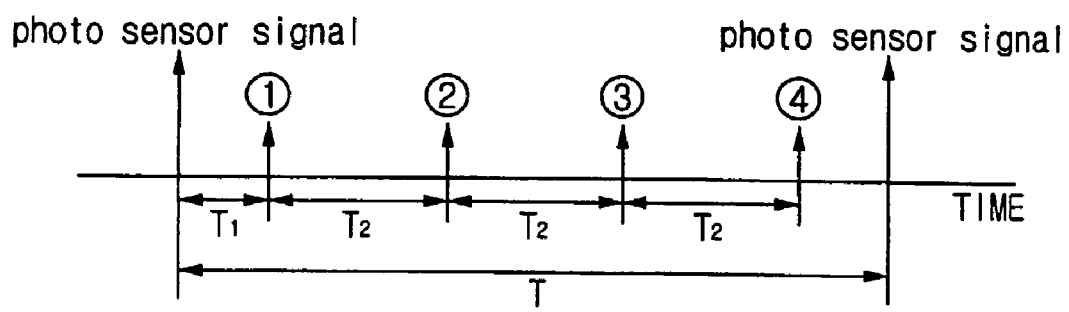
FIG. 16 is a diagram illustrating sampling period compensation according to a case in which the rotation speed of the sub-reflector rotation part is changed.
Figure 16:
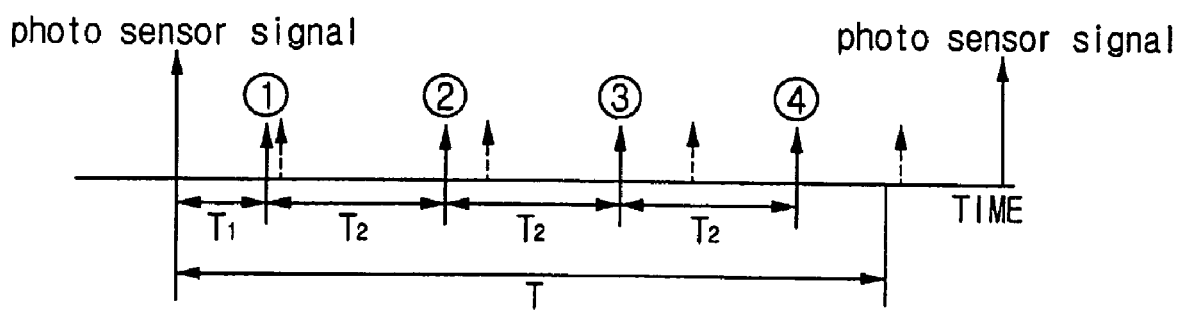

FIG. 16 is a diagram illustrating sampling period compensation in case that rotation speed of a sub-reflector rotation part is changed in the third embodiment.

In satellite signal sampling according to the third embodiment, in case that a reflector rotation part is worn and aged to change rotation speed of a sub-reflector, if a sampling period of a satellite signal according to a position in which the sub-reflector is tilted is predetermined to sample, an error may occur between a position in which sub-reflector is tilted and an instant of time that the satellite signal is sampled as illustrated in FIG. 16.

For example, when a sub-reflector is rotated faster or slower than previously measured rotation period T, for example, rotation speed of a sub-reflector rotation part can be changed by change of motor driving voltage, an instant of time that the satellite signal is sampled precedes an instant of time that a the sub-reflector is tilted in a predetermined direction. Since an error is caused by the described above, performance of tracking a target satellite may be lowered.

When a sub-reflector is rotated slower than the previously measured period T in FIG. 16, a satellite signal sampling part samples the satellite signal before a position shown as dotted lines, in which the sub-reflector is precisely tilted.

In order to compensate a sampling period according to change of rotation speed of a sub-reflector, a detection means generates and transmits an interrupt signal to a period control module when an absolute position measurement bar of the sub-reflector passes. The period control module measures the rotation period of the sub-reflector, which is changed, in real time. Generates a satellite signal sampling period according to the sub-reflector rotation period, performs satellite signal sampling at a precise instant of time that the sub-reflector is tilted in response to the changed sub-reflector rotation period, control a reflector always directed to a main lobe of the satellite signal.

For example, in case that the rotation period of the sub-reflector is changed, in an N+1th rotation in associated with a period T(N) of Nth rotation of the sub-reflector, the period control module computes the amount of time $T_1(N+1)$, in which the absolute position measurement bar passes the detection means, an interrupt signal is generated, and the satellite signal is sampled in a first specific position, by using an equation $T_1(N+1)=\theta_{offset}/360° * T(N)$. In this case, $\theta_{offset}$ is an angle between a photo sensor and the first specific position.

Also, in the period T(N) of the N+1 rotation of the sub-reflector, the period control module computes the amount of time $T_2(N+1)$ that is a period in which the satellite signal is sampled in a specific position such as 2 to K by using an equation $T_2(N+1)=T(N)/K$, in which K is a number of sampling the satellite signal.

Referring to FIG. 13, when the sub-reflector 1320 is rotated N+1 times, the satellite sampling part 1340 samples the satellite signal in at least one specific position in which the sub-reflector 1320 is tilted by using a computed sampling period. When a sampling period is generated by the period control module 1350, the satellite signal sampling part 1340 can samples the satellite signal by using the generated sampling period.

The azimuth position/speed control part 1360 compares the size of the satellite signals sampled in the at least specific position and generates an azimuth control command signal. The elevation position/speed control part 1360 compares the size of the satellite signals sampled in the at least specific position and generates an elevation control command signal. The azimuth/elevation control command signals can be generated using the same method as described above in associated with the satellite tracking antenna system according to the second embodiment.

The reflector driving means 1380 drives the reflector 1310 in the azimuth or elevation direction according to the generated azimuth or elevation control command signal. Since the reflector 1310 driven in the direction is precisely directed to the main lobe of the satellite signal, the satellite tracking antenna system can effectively receive the satellite signal.

Figure 17:
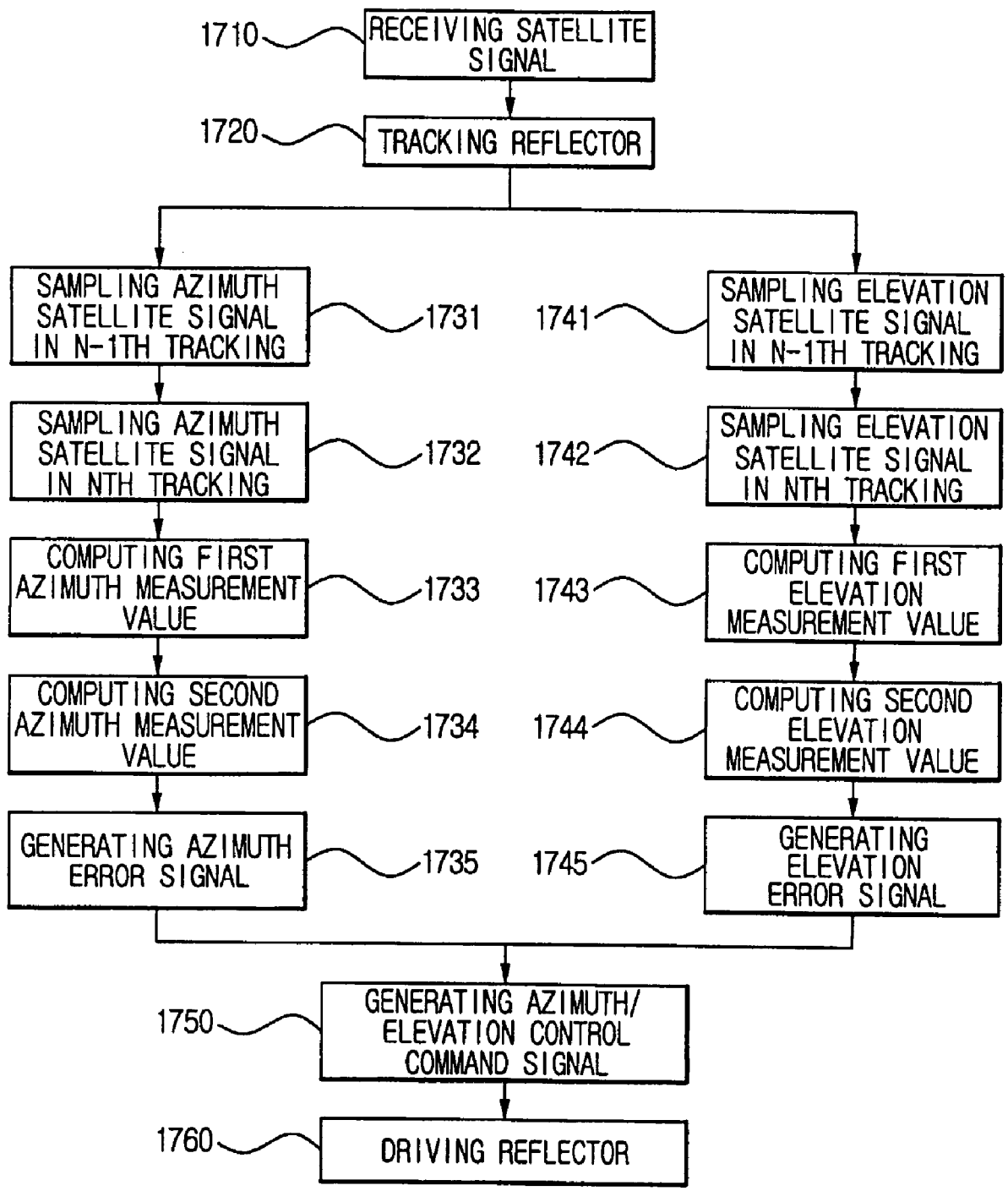
FIG. 17 is a flow chart illustrating a flow of a satellite tracking method of the satellite tracking antenna system according to the first embodiment.

FIG. 17 is a flow chart illustrating a satellite tracking method of the satellite tracking antenna system according to the first embodiment.

The satellite tracking antenna system according to the first embodiment receives a satellite signal from a directional satellite in step 1710 and realizes a tracking operation by tilting a reflector in a predetermined azimuth or elevation direction toward the satellite in step 1720.

The satellite tracking antenna system samples an azimuth satellite signal in at least one azimuth direction in which the reflector is tilted in Nth tracking of the reflector in step 1731 and samples an azimuth satellite signal in at least one azimuth direction in which the reflector is tilted in Nth tracking of the reflector in step 1732. A first azimuth measurement value is computed using a difference between the azimuth satellite signal level values sampled respectively at a first and second azimuth position of the Nth tracking of the reflector in step 1733. A second azimuth measurement value is computed using a difference between the azimuth satellite signal level values sampled respectively at the first azimuth position of the Nth tracking and a second azimuth position of N−1th tracking in step 1734.

The satellite tracking antenna system generates an azimuth error signal by averaging the first azimuth measurement value computed in step 1733 and the second azimuth measurement value computed in step 1734 in step 1735.

Also, the satellite tracking antenna system samples an elevation satellite signal in at least one elevation direction in which the reflector is tilted in Nth tracking of the reflector in step 1741 and samples an elevation satellite signal in at least one elevation direction in which the reflector is tilted in Nth tracking of the reflector in step 1742. A first elevation measurement value is computed using a difference between the elevation satellite signal level values sampled respectively at a first and second elevation position of the Nth tracking of the reflector in step 1743. A second elevation measurement value is computed using a difference between the elevation satellite signal level values sampled respectively at the first elevation position of the Nth tracking and a second elevation position of N−1th tracking in step 1744.

The satellite tracking antenna system generates an elevation error signal by averaging the first elevation measurement value computed in step 1743 and the second elevation measurement value computed in step 1744 in step 1745.

The satellite tracking antenna system generates an azimuth control command signal from the azimuth error signal generated in step 1735 and generates an elevation control command signal from the elevation error signal generated in step 1745 in step 1750. The reflector is driven in azimuth or elevation direction according the generated azimuth or elevation control command signal in step 1760. Therefore, the satellite tracking antenna system can be precisely directed to a main lobe of the satellite signal.

Also, the satellite tracking antenna system tilts a sub-reflector in at least one direction instead of tracking of a reflector and tracks a satellite by applying the satellite tracking method illustrated in FIG. 17.

Figure 18:
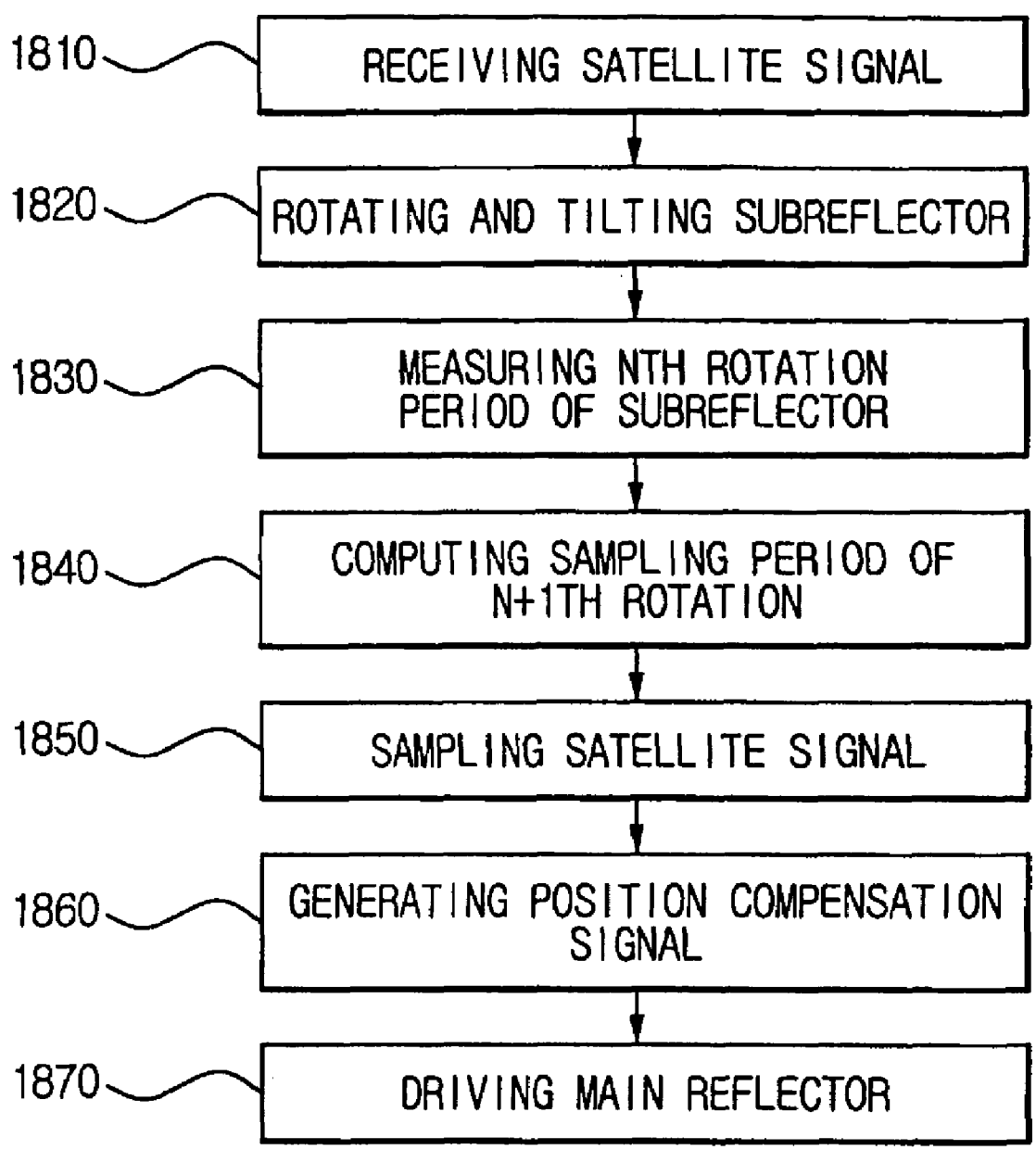
FIG. 18 is a flow chart illustrating a flow of a satellite tracking method of the satellite tracking antenna system according to the second embodiment.

FIG. 18 is a flow chart illustrating a satellite tracking method of the satellite tracking antenna system according to the third embodiment.

The satellite tracking antenna system according to the third embodiment receives a satellite signal from a directional satellite in step 1810. A sub-reflector of the satellite tracking antenna system is rotated and tilted in at least one specific position in step 1820.

When the sub-reflector is rotated and tilted, the satellite tracking antenna system measures an Nth rotation period of the sub-reflector in step 1830. A satellite signal sampling period of an N+1th rotation of the sub-reflector is computed by using the Nth rotation period in step 1840.

In step 1840, in the N+1th rotation, the satellite tracking antenna system computes the sampling period $T_1(N+1)$ that is the amount of time in which an absolute position measurement bar passes a predetermined detection means, an interrupt signal is generated by the detection means, and a reflector position/speed control part samples a satellite signal in a first specific position in which the sub-reflector is tilted by using an equation $T_1(N+1)=\theta_{offset}/360° *T(N)$. $\theta_{offset}$ is information of an angle between the detection means and the first specific position, and the $T(N)$ is the Nth rotation period of the sub-reflector. A sampling period $T_2(N+1)$ that is the amount of time in which the satellite signal is sampled respectively at 2nd to Kth positions after the satellite signal is sampled at the first specific position can be computed by using an equation $T_2(N+1)=T(N)/K$. The K is information of the number of sampling the satellite signal.

The satellite tracking antenna system samples the satellite signal in the at least one specific position in which the sub-reflector is tilted in the N+1th rotation of the sub-reflector by applying the sampling period computed in step 1840 in step 1850.

The satellite tracking antenna system compares the sizes of the satellite signal sampled in step 1850 and generates an azimuth control command signal or an elevation control command signal in step 1860. The reflector is driven in predetermined azimuth or elevation direction according to the generated azimuth or elevation control command signal in step 1870. Since the reflector is driven in the direction as described above to be precisely directed to a main lobe of the satellite signal, the satellite tracking antenna system can receive the satellite signal more effectively.

The embodiments of the present invention as described above include a computer readable medium including a program instruction to perform various operations executed by a computer. The computer readable medium can include a program instruction, data file, data structure, etc., by itself or in combination with each other. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the satellite tracking antenna system and satellite tracking method of the present invention, tracking operation in which a reflector of the satellite tracking antenna system is tilted in at least one specific direction is controlled. A satellite signal level value sampled at a position in which the reflector is tilted in the specific direction in N−1 tracking of the reflector and a satellite signal level value sampled at a position in which the reflector is tilted in the specific direction in Nth tracking are averaged, thereby generating azimuth or elevation error signal. A directional direction of the reflector is moved according to the error signal such that the reflector is always directed to a main lobe of the satellite signal, thereby realizing step tracking. Therefore, a satellite can be precisely tracked regardless of rapid movement of a mobile body equipped with the satellite tracking antenna system.

Also, according to the satellite tracking antenna system and satellite tracking method, tracking operation in which a sub-reflector of the satellite tracking antenna system is tilted in at least one specific direction is controlled. A satellite signal level value sampled at a position in which the sub-reflector is tilted in the specific direction in N−1 tracking of the sub-reflector and a satellite signal level value sampled at a position in which the sub-reflector is tilted in the specific direction in Nth tracking are averaged, thereby generating azimuth or elevation error signal. A directional direction of the reflector is moved according to the error signal such that the reflector is always directed to a main lobe of the satellite signal, thereby realizing conical scan. Therefore, a satellite can be precisely tracked regardless of rapid movement of a mobile body equipped with the satellite tracking antenna system by tilting the sub-reflector.

Also, according to the satellite tracking antenna system and satellite tracking method, an absolute position measurement bar is installed at a sub-reflector and a detection means is installed at a sub-reflector rotation part. When the absolute position measurement bar passes the detection means, an interrupt signal is generated to measure a rotation period of the sub-reflector in real time. A sampling period that is time information to sample a satellite signal is frequently updated and compensated by using the rotation period of the sub-reflector measured in real time. Therefore, if the rotation period of the sub-reflector is changed, the satellite signal is sampled in a position of tilting the sub-reflector, which is always regular, thereby obtaining effects of precisely tracking the satellite.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A satellite tracking antenna system comprising:
   a reflector directed to a predetermined satellite, tilted in a direction of a predetermined azimuth or elevation toward the satellite, and receiving a satellite signal from the satellite;
   an azimuth signal level measuring part computing a first azimuth measurement value which is a difference between azimuth satellite signal level values sampled respectively in a first azimuth position and second azimuth position of Nth tracking of the reflector, computing a second azimuth measurement value which is a difference between azimuth satellite signal level values sampled respectively in the first azimuth position and second azimuth position of N−1th tracking, and averaging the computed first azimuth measurement value and the second azimuth measurement value to generate an azimuth error signal;
   an azimuth position/speed control part generating an azimuth control command signal with respect to the satellite directional direction using the azimuth error signal; and
   a reflector driving means for driving the reflector in azimuth direction according to the azimuth control command signal.

2. The satellite tracking antenna system of claim 1, further comprising:
   an elevation signal level measuring part computing a first elevation measurement value which is a difference between elevation satellite signal level values sampled respectively in a first elevation position and second elevation position of Nth tracking of the reflector, computing a second elevation measurement value which is a difference between elevation satellite signal level values sampled respectively in the first elevation position and second elevation position of N−1th tracking, and averaging the computed first elevation measurement value and the second elevation measurement value to generate an elevation error signal; and
   an elevation position/speed control part generating an elevation control command signal with respect to the satellite directional direction using the elevation error signal, and
   wherein the reflector driving means driving the reflector in elevation direction according to the elevation control command signal.

3. The satellite tracking antenna system of claim 1, wherein the satellite tracking antenna system is mounted on a moving mobile body.

4. A satellite tracking antenna system comprising:
   a reflector directed to a predetermined satellite and receiving a satellite signal from the satellite;
   a sub-reflector tilted in a predetermined azimuth or elevation and receiving the satellite signal reflected by the reflector to focus on a predetermined lead-in waveguide;
   an azimuth signal level measuring part computing a first azimuth measurement value which is a difference between azimuth satellite signal level values sampled respectively in a first azimuth position and second azimuth position of Nth tracking of the reflector, computing a second azimuth measurement value which is a difference between azimuth satellite signal level values sampled respectively in the first azimuth position and second azimuth position of N−1th tracking, and averaging the computed first azimuth measurement value and the second azimuth measurement value to generate an azimuth error signal;
   an elevation signal level measuring part computing a first elevation measurement value which is a difference between elevation satellite signal level values sampled respectively in a first elevation position and second elevation position of Nth tracking of the reflector, computing a second elevation measurement value which is a difference between elevation satellite signal level values sampled respectively in the first elevation position and second elevation position of N−1th tracking, and averaging the computed first elevation measurement value and the second elevation measurement value to generate an elevation error signal;
   an azimuth position/speed control part generating an azimuth control command signal with respect to the satellite directional direction using the azimuth error signal;
   an elevation position/speed control part generating an elevation control command signal with respect to the satellite directional direction using the elevation error signal; and
   a reflector driving means for driving the reflector in a direction of one of an azimuth according to the azimuth control command signal and an elevation according to the elevation control command signal.

5. The satellite tracking antenna system of claim 4, further comprising a sub-reflector rotation part for rotating the sub-reflector, wherein the sub-reflector is rotated, is tilted, and tracks in the direction of one of the azimuth and the elevation.

6. The satellite tracking antenna system of claim 5, wherein the satellite tracking antenna system is mounted on a moving mobile body.

7. A satellite tracking antenna system comprising:
   a reflector for receiving a satellite signal from a predetermined satellite;
   a sub-reflector tilted in at least one specific position and focusing the satellite signal reflected by the reflector on a predetermined lead-in waveguide;
   a sub-reflector rotation part rotating the sub-reflector;
   a satellite signal sampling part sampling the satellite signal focused by the sub-reflector according to a predetermined sampling period; and
   a period control module measuring an Nth rotation period of the sub-reflector and computing the sampling period of the satellite of an N+1th rotation of the sub-reflector using the Nth rotation period,
   wherein the satellite signal sampling part samples the satellite signal in the at least one specific position where the sub-reflector is tilted by applying the sampling period computed by the period control module in the N+1 rotation of the sub-reflector.

8. The satellite tracking antenna system of claim 7, further comprising:
   an azimuth position/speed control part comparing the size of the satellite signal sampled in the at least one specific position and generating an azimuth control command signal;
   an elevation position/speed control part comparing the size of the satellite signal sampled in the at least one specific position and generating an elevation control command signal; and
   a reflector driving means for driving the reflector in a direction of one of an azimuth according to the generated azimuth control command signal and an elevation according to the generated elevation control command signal.

9. The satellite tracking antenna system of claim 7, wherein the sub-reflector includes a predetermined absolute position measurement bar, the sub-reflector rotation part includes a predetermined detection means through which the absolute position measurement bar passes according to rotation of the sub-reflector, and the detection means generates a predetermined interrupt signal when the absolute position measurement bar passes.

10. The satellite tracking antenna system of claim 9, wherein the period control module:
computes a sampling period $T_1(N+1)$ which is predetermined amount of time in which the reflector position/speed control part samples the satellite signal in a first specific position where the sub-reflector is tilted after the absolute position measurement bar passes through the detection means and the interrupt signal is generated by the detection means in an N+1th rotation of the sub-reflector, using the equation of $T_1(N+1)=\theta_{offset}/360*T(N)$, in which the $\theta_{offset}$ is information of an angle between the detection means and the first specific position and T(N) is the Nth rotation period of the sub-reflector; and
computes a sampling period $T_2(N+1)$ which is predetermined amount of time in which the satellite signals are sampled respectively in a second to kth specific positions after the satellite signal is sampled in the first specific position using the equation of $T_2(N+1)=T(N)/k$ in which the k is the number of sampling the satellite signal.

11. The satellite tracking antenna system of claim 7, wherein the sub-reflector is tilted to have a predetermined gradient on an axis of the reflector and such that an axis of the sub-reflector and the axis of the reflector cross each other.

12. A method of tracking a satellite of a satellite tracking antenna system, comprising the operations of:
receiving a satellite signal from a directed satellite;
tilting a reflector of the satellite tracking antenna system in a direction of one of a predetermined azimuth or elevation toward the satellite;
computing a first azimuth measurement value which is a difference between azimuth satellite signal level values sampled respectively in a first and second azimuth positions of Nth tracking of the reflector;
computing a second azimuth measurement value which is a difference between azimuth satellite signal level values sampled respectively in the computed first azimuth position of the Nth tracking and a second azimuth of N−1th tracking;
generating an azimuth error signal by averaging the computed first and second azimuth measurement values;
generating an azimuth control command signal with respect to a directional direction of the satellite using the azimuth error signal;
driving the reflector in azimuth direction according to the azimuth control command signal.

13. The method of claim 12, further comprising the operations of:
computing a first elevation measurement value which is a difference between elevation satellite signal level values sampled respectively in a first and second elevation positions of Nth tracking of the reflector;
computing a second elevation measurement value which is a difference between elevation satellite signal level values sampled respectively in the computed first elevation position of the Nth tracking and a second elevation of N−1th tracking;
generating an elevation error signal by averaging the computed first and second elevation measurement values;
generating an elevation control command signal with respect to a directional direction of the satellite using the elevation error signal;
driving the reflector in elevation direction according to the elevation control command signal.

14. A method of tracking satellite of a satellite tracking antenna system, comprising the operations of:
receiving a satellite signal from a directed satellite;
tilting a sub-reflector of the satellite tracking antenna system in a direction of one of a predetermined azimuth or elevation toward the satellite;
computing a first azimuth measurement value which is a difference between azimuth satellite signal level values sampled respectively in a first and second azimuth positions of Nth tracking of the sub-reflector;
computing a second azimuth measurement value which is a difference between azimuth satellite signal level values sampled respectively in the computed first azimuth position of the Nth tracking and a second azimuth of N−1th tracking;
computing a first elevation measurement value which is a difference between elevation satellite signal level values sampled respectively in a first and second elevation positions of Nth tracking of the sub-reflector;
computing a second elevation measurement value which is a difference between elevation satellite signal level values sampled respectively in the computed first elevation position of the Nth tracking and a second elevation of N−1th tracking;
generating an azimuth error signal by averaging the computed first and second azimuth measurement values and generating an elevation error signal by averaging the computed first and second elevation measurement values;
generating an azimuth control command signal with respect to a directional direction of the satellite using the azimuth error signal and generating an elevation control command signal with respect to a directional direction of the satellite using the elevation error signal; and
driving the sub-reflector in elevation direction according to one of the azimuth control command signal and the elevation control command signal.

15. A method of tracking a satellite of a satellite tracking antenna system, comprising the operations of:
receiving a satellite signal from a directed satellite;
rotating and tilting a sub-reflector of the satellite tracking antenna system to at least one specific position;
measuring an Nth rotation period of the sub-reflector;
computing a sampling period of the satellite signal in an N+1th rotation of the sub-reflector using the Nth rotation period;
sampling the satellite signal in case of the N+1 rotation of the sub-reflector in at least one specific position where the sub-reflector is tilted by applying the calculated sampling period,
comparing the sizes of the satellite signals sampled in the at least one specific position and generating one of the azimuth control command signal and the elevation control command signal; and
driving the sub-reflector in one of a predetermined azimuth and a predetermined elevation according to one of the generated azimuth control command signal and the elevation control command signal.

16. The method of claim 15, wherein the operations of computing the sampling period of the satellite signal in the N+1th rotation of the sub-reflector using the Nth rotation period comprising the operations of:

computing a sampling period $T_1(N+1)$ which is predetermined amount of time in which the reflector position/speed control part samples the satellite signal in a first specific position where the sub-reflector is tilted after the absolute position measurement bar passes through the detection means and the interrupt signal is generated by the detection means in an N+1th rotation of the sub-reflector, using the equation of $T_1(N+1)=\theta_{offset}/360*T(N)$, in which the $\theta_{offset}$ is information of an angle between the detection means and the first specific position and $T(N)$ is the Nth rotation period of the sub-reflector; and computing a sampling period $T_2(N+1)$ which is predetermined amount of time in which the satellite signals are sampled respectively in a second to kth specific positions after the satellite signal is sampled in the first specific position using the equation of $T_2(N+1)=T(N)/k$ in which the k is the number of sampling the satellite signal.

* * * * *